United States Patent [19]

Halasz

[11] 4,272,773
[45] Jun. 9, 1981

[54] INK SUPPLY AND FILTER FOR INK JET PRINTING SYSTEMS

[75] Inventor: Laszlo Halasz, Brecksville, Ohio
[73] Assignee: Gould Inc., Rolling Meadows, Ill.
[21] Appl. No.: 42,189
[22] Filed: May 24, 1979
[51] Int. Cl.³ .................... G01D 15/16; G01D 15/18
[52] U.S. Cl. .......................... 346/140 R; 346/140 A
[58] Field of Search ................... 346/140 R, 140 PD

[56] References Cited
U.S. PATENT DOCUMENTS

| 3,452,359 | 6/1969 | Lane | 346/140 R |
| 3,708,798 | 1/1973 | Hildenbrand et al. | 346/140 PD |
| 3,832,579 | 8/1974 | Arndt | 346/140 PD X |
| 3,953,862 | 4/1976 | Amberntsson et al. | 346/140 PD |

Primary Examiner—George H. Miller, Jr.
Attorney, Agent, or Firm—Edward E. Sachs

[57] ABSTRACT

A sealed, collapsible container is disclosed for ink supply in ink jet printing systems. Fill and delivery conduits extending into the container terminate in small filter assemblies having a filter element made from compressed fibers forming a plurality of substantially parallel passages through which capillary flow is achievable.

6 Claims, 2 Drawing Figures

INK SUPPLY AND FILTER FOR INK JET PRINTING SYSTEMS

BACKGROUND OF THE INVENTION

Recent years have seen a rapid growth in interest in and commercial applications of ink jet printing technology. Many commercial systems today embody ink jets of the type disclosed in U.S. Pat. No. 3,298,030 issued to Lewis and Brown and U.S. Pat. No. 3,596,275 issued to Sweet, in which ink under substantial pressure is delivered to the ink jets, which produce a continuous stream of tiny droplets used for printing. U.S. Pat. No. 3,683,212 issued to Zoltan discloses an improved type of ink jet technology in which ink at atmospheric pressure or below flows to the jet by capillary action, where individual droplets are ejected on demand, rather than continuously.

In the drop-on-demand ink jet technology, the small size of the ink jet outlet, typically in the range of 0.00762 cm to 0.01279 cm, causes the system to be sensitive to particulates in the ink which could cause clogging of the outlet orifice. Such particulates may be due to dust and the like or precipitates in the ink itself. Also, the presence of minute air bubbles in the jet can lead to improper operation and loss of prime of the jet. In some instances, where the ink supply is located somewhat above the jet outlets, a sufficient pressure head may develop to cause dripping of ink from the jet.

OBJECTS OF THE INVENTION

An object of the invention is to provide an improved ink supply system for use with ink jet printers.

Another object of the invention is to provide a simple, inexpensive filter for use in the ink supply line of an ink jet printer to prevent passage of bubbles and particulates.

Still another object of the invention is to provide an ink supply system as previously mentioned which is inexpensive and economically disposable after emptying.

These objects are given only as examples. Thus, other desirable objectives and advantages inherently achieved by the disclosed structure may be apparent to those skilled in the art. Nonetheless, the scope of the invention is to be limited only by the appended claims.

SUMMARY OF THE INVENTION

The above objects and other advantages are achieved by the invention, in which a collapsible sealed container or bag is provided with an ink delivery conduit extending into the container, the inlet end of the conduit having a tiny filter made up of an element of compressed fibers forming a plurality of substantially parallel passages through which capillary flow is achievable. The filter element also is provided separately for inclusion in the supply line to an ink jet printer at any convenient location.

DETAILED DESCRIPTION OF THE PREFERRED EMBODIMENTS

Figure 1:
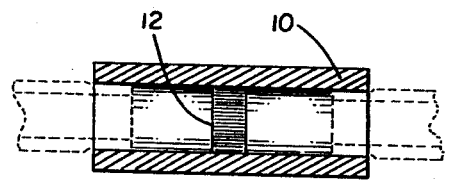
FIG. 1 shows a sectional view of an ink jet ink supply filter according to the invention.

The following is a detailed description of the presently preferred embodiments of the invention, reference being made to the drawing in which like reference numerals identify like elements of structure in the two Figures.

FIG. 1 shows a sectional view of an ink jet ink supply filter according to the invention. A short segment 10 of conduit or tubing is provided, which preferably is made from a material such as Tygon or polyethylene. In a typical ink jet application, the ink supply tubing or other conduit is 0.1778 cm in outer diameter and 0.04064 cm in inner diameter and is of similar material, though other tubing sizes may be used with the invention. When a tubing having the dimension just mentioned is used, segment 10 is preferably chosen to be about 0.508 cm long, with an outer diameter of 0.254 cm and an inner diameter of 0.1778 cm. Centrally located within segment 10 is a filter element 12 which preferably is a short cylinder of compressed fibers which form among themselves a plurality of substantially parallel passages through which capillary flow is achievable. Preferably, element 12 is made from compressed 0.003 cm diameter Dacron fibers or the like, of the type used in some fiber tip pens. Other materials such as polyethylene and nylon may be used for the fibers, but Dacron is preferred due to its resistance to acids used in some ink jet inks. The diameters of the fibers are chosen to be in the range of about 0.0015 to 0.0045 cm so that the passages between them will permit ink flow by capillary action but prohibit a free flow of ink under moderate pressure drop across the element. The length of element 12 will vary somewhat depending on the application of the ink jet printing system in which it is used; however, when ink supply tubing of the type previously mentioned is used, a length of 0.15875 cm and a diameter of about 0.19558 cm have been found to give excellent results. The diameter is not critical, so long as filter element 12 is securely captured within segment 10. However, the length of element 12 is preferably in the range of 0.100 cm to 0.254 cm to ensure both adequate flow rate and filter performance. If the length is much greater, then the associated ink jet or jets may tend to starve; and if it is much shorter, its filtering ability is reduced as is its mechanical strength. The filter stops particulates as small as 1 micron, impedes air bubbles and yet allows adequate flow for ink jet printing purposes, when inserted in an ink jet ink supply conduit, as illustrated in phantom.

Figure 2:
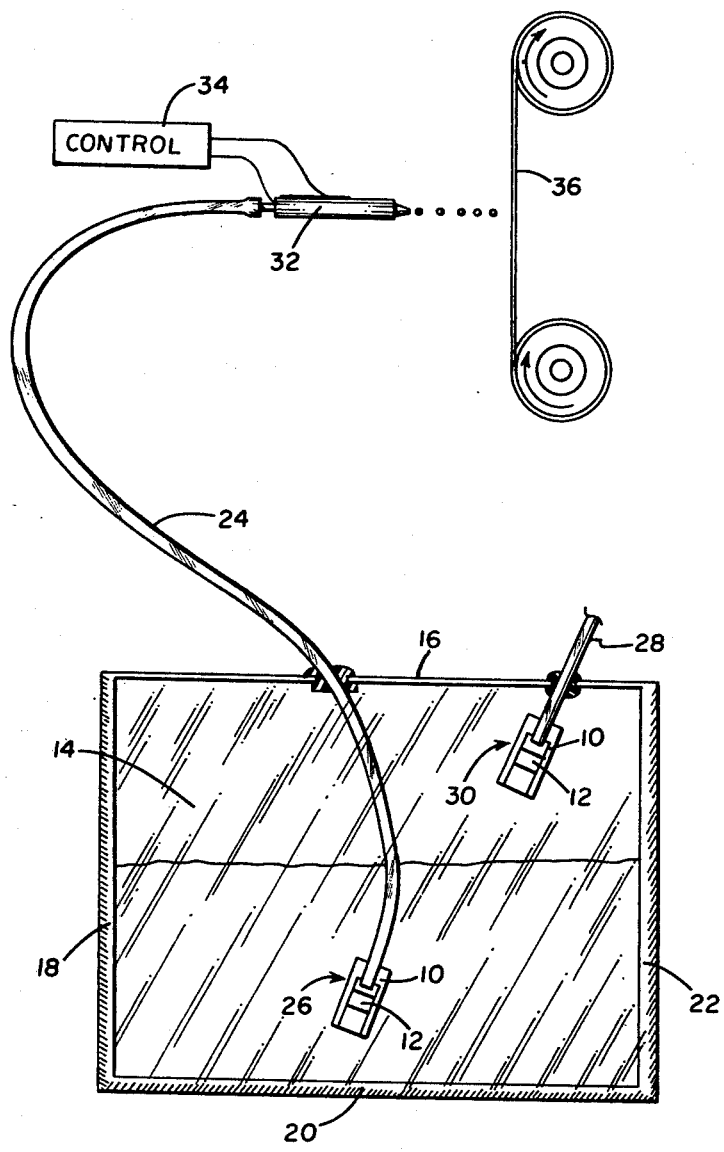
FIG. 2 shows the improved ink jet ink supply system according to the invention, indicating schematically its connection to an ink jet printing device.

FIG. 2 illlustrates an ink jet ink supply system according to the invention. A container or bag 14 is provided by folding a blank of vinyl, polyethylene, Saran or similar material along line 16 and then heat sealing the mating edges 18,20,22. A wall thickness of about 0.03048 cm provides desirable collapsibility as the bag empties. Prior to heat sealing, however, an ink delivery conduit 24 is passed through a small opening along line 16 and sealed to the vinyl or other material by means such as heat sealing or liquid vinyl cement. Conduit 24 is of sufficient length to reach down close to edge 20 and is provided with a filter 26 of the type shown in FIG. 1. An ink fill conduit 28 is also provided in a manner identical to that used for conduit 24; however, conduit 28 preferably terminates rather near to line 16. A filter 30 also may be provided on the lower end of conduit 28.

In use, bag 14 is filled through conduit 28. Where filter 30 is used, the fill rate is rather slow; however, the prefiltering of the ink is desirable where practical. Excess air is squeezed out though conduit 28. Conduit 28 is then sealed by application of heat or a suitable cap (not shown). The other end of delivery or supply conduit 24 is fitted to an ink jet assembly 32, which may be of the type described in the previously mentioned Zoltan patent. Assembly 32 is driven by a suitable control 34 and ejects tiny ink droplets, as illustrated, toward an adjacent record medium 36. Ink reaches assembly 32 by flowing due to capillary action through filter 26 and conduit 24. Typically, bag 14 is located so that no gravity head is imposed on the ink flowing toward assembly 32; however, where a gravity head exists or moderate pressure is applied to bag 14, filter 26 acts to dissipate the effects of the pressure so that no ink dripping occurs at assembly 32.

Having described my invention in sufficient detail to enable those skilled in the art to make and use it, I claim:

1. An improved ink supply container for use in ink jet printing systems, comprising:
   a sealed collapsible container;
   at least one ink delivery conduit extending through a wall of said container, said conduit having an inlet end located in said container;
   a conduit segment having a bore sized to receive said inlet end; and
   a filter element located within said bore, said element comprising a cylinder of compressed fibers forming a plurality of substantially parallel passages through which capillary flow is achievable.

2. An improved container according to claim 1, wherein said filter element comprises a bundle of closely packed Dacron fibers sized to permit flow of ink jet ink by capillary action.

3. An improved container according to claim 1, wherein said cylinder is from 0.100 to 0.254 cm in length.

4. An improved container according to claim 1, further comprising at least one ink fill conduit extending through a wall of said container, said fill conduit having a discharge end located in said container; a further conduit segment having a further bore sized to receive said discharge end; and a further filter element located within said further bore, said further element also comprising a cylinder of compressed fibers forming a plurality of substantially parallel passages through which capillary flow is achievable.

5. An improved container according to claim 4, wherein said further filter element comprises a bundle of closely packed Dacron fibers sized to permit flow of ink jet ink by capillary action.

6. An improved container according to claim 5, wherein said cylinder is from 0.100 to 0.254 cm in length.

* * * * *